US 8,271,886 B2

(12) United States Patent
Lee et al.

(10) Patent No.: US 8,271,886 B2
(45) Date of Patent: Sep. 18, 2012

(54) SYSTEM AND METHOD FOR EXPANDING TARGET INVENTORY ACCORDING TO BROWSER-LOGIN MAPPING

(75) Inventors: Hyungseok Lee, Gyeonggi-do (KR); Sang Wook Han, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 433 days.

(21) Appl. No.: 12/052,706

(22) Filed: Mar. 20, 2008

(65) Prior Publication Data
US 2008/0235243 A1 Sep. 25, 2008

(30) Foreign Application Priority Data
Mar. 21, 2007 (KR) .................. 10-2007-0027741

(51) Int. Cl.
*G06F 17/30* (2006.01)
(52) U.S. Cl. ...................... 715/745; 715/854
(58) Field of Classification Search .......... 715/745, 715/854
See application file for complete search history.

(56) References Cited

U.S. PATENT DOCUMENTS

| | | | | |
|---|---|---|---|---|
| 6,704,031 B1* | 3/2004 | Kimball et al. | ............... | 715/745 |
| 6,771,290 B1* | 8/2004 | Hoyle | ............... | 715/745 |
| 6,850,260 B1* | 2/2005 | Taylor | ............... | 715/835 |
| 6,868,525 B1* | 3/2005 | Szabo | ............... | 715/738 |
| 2002/0087625 A1* | 7/2002 | Toll et al. | ............... | 709/203 |
| 2002/0149616 A1* | 10/2002 | Gross et al. | ............... | 345/745 |
| 2002/0174230 A1* | 11/2002 | Gudorf et al. | ............... | 709/227 |
| 2004/0070606 A1* | 4/2004 | Yang et al. | ............... | 345/745 |
| 2005/0005242 A1* | 1/2005 | Hoyle | ............... | 715/745 |
| 2005/0257156 A1* | 11/2005 | Jeske et al. | ............... | 715/745 |
| 2006/0265283 A1* | 11/2006 | Gorodyansky | ............... | 705/14 |

FOREIGN PATENT DOCUMENTS

| | | |
|---|---|---|
| JP | 2003-067289 | 3/2003 |
| KR | 10-2001-0076023 | 8/2001 |
| KR | 1020010110554 A | 12/2001 |
| KR | 10-2003-0006426 | 1/2003 |
| KR | 1020070028014 A | 3/2007 |

* cited by examiner

*Primary Examiner* — Kim Nguyen
(74) *Attorney, Agent, or Firm* — H.C. Park & Associates, PLC

(57) ABSTRACT

A target advertising system includes a user profile database configured to store browser-login mapping information associated with mapping of browser cookie information and login cookie information, an advertisement server configured to identify an access by a web browser and to transfer browser cookie information of the web browser to a user behavior server, and the user behavior server configured to receive the browser cookie information from the advertisement server, to identify, from the user profile database, user profile information of the browser-login mapping information corresponding to the browser cookie information, and to transfer the identified user profile information to the advertisement server.

17 Claims, 6 Drawing Sheets

FIG. 5

<USER PROFILE DB>

| BROWSER-LOGIN MAPPING INFORMATION | USER PROFILE INFORMATION ||
|---|---|---|
| B1000000001-CHM112 | AGE | 25 |
| | SEX | FEMALE |
| | REGION | SEOUL |
| B1000000002-ABC111 | AGE | 30 |
| | SEX | MALE |
| | REGION | BUSAN |
| ⋮ | ⋮ | ⋮ |

FIG. 6

<ADVERTISEMENT DB>

| SEX / AGE | FAMALE | MALE | REGION | |
|---|---|---|---|---|
| TEENS | INSTITUTE, SCHOOL | EXERCISE, INSTITUTE | SEOUL | SCHOOL, SEOUL STATION |
| TWENTIES | DIET, MINISKIRT | JOB SEEKING, HEALTH | GYEONGGI | APARTMENT, SALE |
| THIRTIES | BABY, FOOD | SAVING, FINANCIAL STRATEGY | INCHEON | AIRPORT, CHINA TOWN |
| ...... | | ...... | ...... | ...... |

SYSTEM AND METHOD FOR EXPANDING TARGET INVENTORY ACCORDING TO BROWSER-LOGIN MAPPING

CROSS-REFERENCE TO RELATED APPLICATION

This application claims the benefit of Korean Patent Application No. 10-2007-0027741, filed on Mar. 21, 2007, in the Korean Intellectual Property Office, the disclosure of which is incorporated herein by reference.

BACKGROUND OF THE INVENTION

1. Field of the Invention

The present invention relates to a method and system for extending a target inventory through browser-login mapping that can store browser-login mapping information by mapping browser cookie information and login cookie information, identify, from the browser-login mapping information, user profile information of a web browser accessing an advertisement server, and display a target advertisement only for a particular user associated with the identified user profile information.

2. Description of Related Art

An advertisement has a lexical meaning of an information activity that a company, a person, or a group invests a product, a service, a theology, a policy, and the like in order to achieve its desired goal. The advertisement may be provided in writing, and as a picture, a voice, and the like, through such media as a television, a radio, and the Internet, and may effectively promote the product and service for people.

Among the media, the Internet is generally used when a user desires to obtain information. Only when the user enters a query, may the Internet provide information associated with the query and also provide advertisement data associated with the query. Accordingly, it is possible to maximize the advertising effect. Due to the above advantages, the Internet is popular as an optimal place where advertisers may display their advertisement data.

Also, among advertisement schemes using the Internet, search portal sites where many users access display various types of advertisement data in an advertisement region of a web page through rolling and also provide the advertisement data in a manner of displaying particular advertisement data associated with a query entered by a user. However, since the above scheme displays various types of advertisement data with respect to different products or services, the scheme is discarded by users. Also, since the scheme displays advertisement data associated with only the query entered by the user, it is impossible to display advertisement data when the user does not enter the query.

In order to solve the above-described problems, the search portal sites use a target advertising method that can identify a user inclination, a user characteristic, and the like to provide tailored advertisement data for each user. In order to use the target advertising method, information capable of identifying the user inclination must be collected. A scheme of collecting the user information may include a scheme of identifying user profile information of a logged-in user and collect the user information. However, due to characteristics of the search portal site, the login rate is less than 20%, which is not high. Accordingly, it is very difficult to collect user profile information.

BRIEF SUMMARY OF THE INVENTION

An aspect of the present invention provides a method and system for extending a target inventory through browser-login mapping that can store browser-login mapping information that is generated by mapping browser cookie information and login cookie information, identify from the browser-login mapping information user profile information of a web browser that accesses an advertisement server, and display particular advertisement data associated with the identified user profile information, and thereby can maximize the target advertising effect.

An aspect of the present invention also provides a method and system for extending a target inventory through browser-login mapping that can analyze browser cookie information and login cookie information stored in a log during a predetermined period of time, generate browser-login mapping information associated with user profile information, and even when a user accesses an advertisement server without logging-in, can display tailored advertisement data for the user using the browser-login mapping information and thereby can extend the target inventory.

According to an aspect of the present invention, there is provided a target advertising system including: a user profile database configured to store browser-login mapping information in a database; an advertisement server configured to read browser cookie information of a web browser which accesses the advertisement server; and the user behavior server configured to retrieve browser-login mapping information associated with the browser cookie information from the database, to identify user profile information based upon the retrieved browser-login mapping information, and to transfer the identified user profile information to the advertisement server. The browser-login mapping information is generated by mapping browser cookie information and login cookie information. The advertisement server transfers the read browser cookie information to a user behavior server. The browser cookie information includes identification of a browser and the login cookie information includes user profile information of a user. The advertisement server displays advertisement data associated with the user profile information on a web page.

According to another aspect of the present invention, there is provided a target advertising method including the steps of: generating and storing browser-login mapping information by mapping browser cookie information and login cookie information in a database; reading browser cookie information of a web browser which accesses a server; retrieving a browser-login mapping information associated with the read browser cookie information from the database; identifying user profile information based upon the retrieved browser-login mapping information; and displaying advertisement data associated with the identified user profile information on a web page.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 5 illustrates an example of a user profile database according to an exemplary embodiment of the present invention; and FIG. 6 illustrates an example of an advertisement database according to an exemplary embodiment of the present invention.

DETAILED DESCRIPTION OF THE INVENTION

Figure 1:
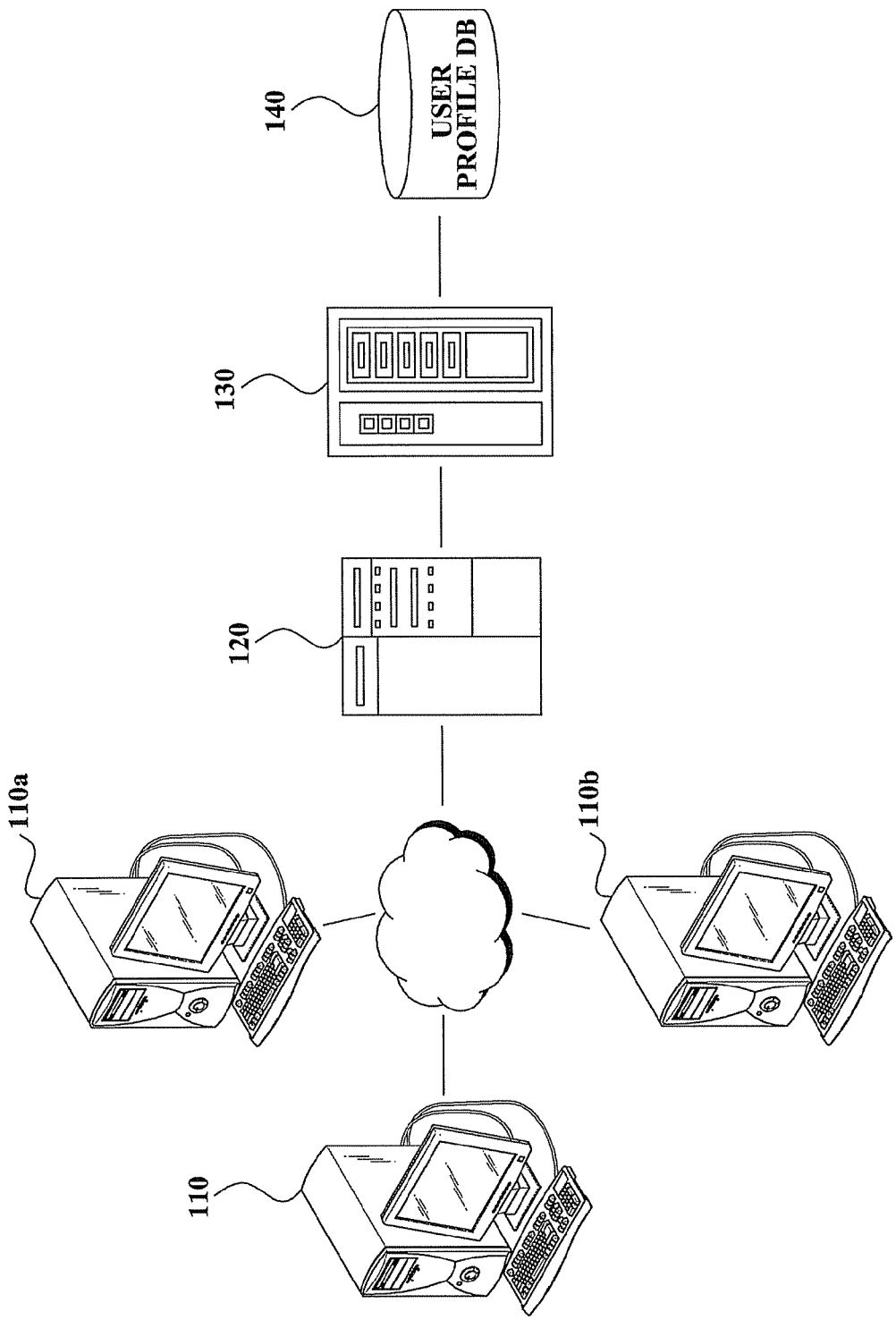
FIG. 1 is a diagram illustrating a network connection of a target advertising system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

FIG. 1 is a diagram illustrating a network connection of a target advertising system according to an exemplary embodiment of the present invention.

A web browser 110 is an application program that enables a user to access the World Wide Web (WWW) and view information. The web browser 110 is also referred to as a "browser".

An advertisement server 120 is a server that displays advertisement data on a web page. The advertisement server 120 maintains in an advertisement database (not shown) storing advertisement data that is classified into user profile information. The advertisement server 120 identifies an access by the web browser 110 and assigns browser cookie information to the web browser 110. The browser cookie information held on the user's browser could include any session cookies used by the application server, user identification cookies or language preferences.

Also, when an information request is received from a logged-in user, the advertisement server 120 identifies user profile information of login cookie information of the user. The user profile information is individual user information that is associated with a demographic classification category such as a sex, an age, a region, and the like. The advertisement server 120 may store the browser cookie information and the login cookie information in a log.

A user behavior server 130 categorizes browser-login mapping information in a user profile database 140 via log analysis. The browser-login mapping information is generated by mapping the browser cookie information and the login cookie information. The user behavior server 130 may identify the user profile information based on the browser-login mapping information.

In order to provide tailored advertisement data for users of web browsers 110, 110a, and 110b accessing the advertisement server 120, the advertisement server 120 needs to be aware of profile information of the users. Accordingly, the advertisement server 120 verifies browser cookie information of the web browsers 110, 110a, and 110b and transmits the verified browser cookie information to the user behavior server 130.

The user behavior server 130 receives the browser cookie information from the advertisement server 120 and identifies, from the user profile database 140, user profile information of browser-login mapping information corresponding to the browser cookie information. The user behavior server 130 transfers the identified user profile information to the advertisement server 120.

The advertisement server 120 receives the user profile information from the user behavior server 130 and displays advertisement data associated with the received user profile information on a web page. The advertisement server 120 may identify from the advertisement database advertisement data associated with the user profile information.

As described above, according to the present invention, it is possible to maximize the target advertising effect by pre-storing browser-login mapping information, identifying user profile information of a web browser accessing an advertisement server using the browser-login mapping information, and displaying particular advertisement data associated with the identified user profile information.

Figure 2:
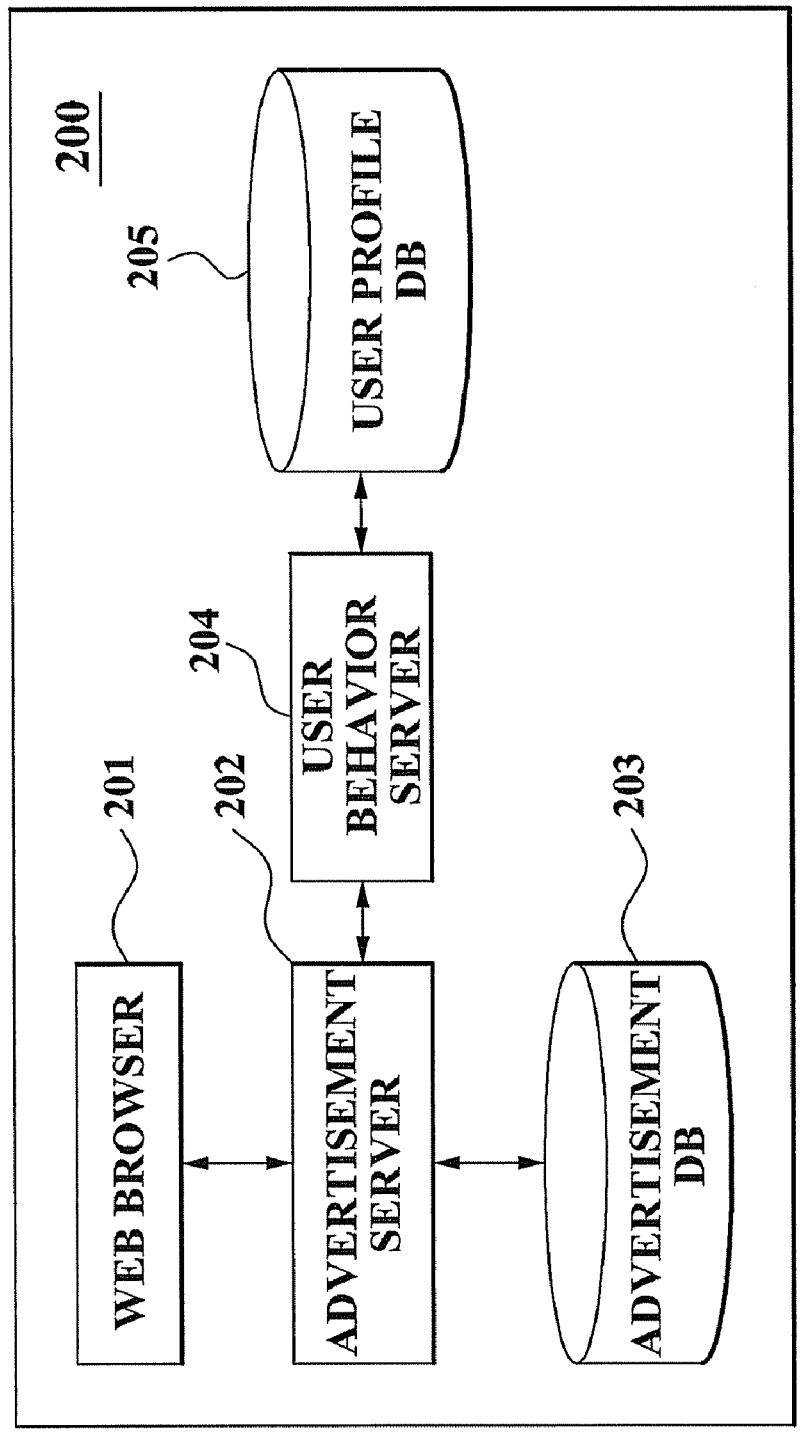
FIG. 2 is a block diagram illustrating a configuration of a target advertising system according to an exemplary embodiment of the present invention.

FIG. 2 is a block diagram illustrating a configuration of a target advertising system 200 according to an exemplary embodiment of the present invention The target advertising system includes a user profile database 205 configured to store browser-login mapping information associated with mapping of browser cookie information and login cookie information, an advertisement server 202 configured to identify an access by a web browser 201 and transfer browser cookie information of the web browser 201 to a user behavior server 204, and the user behavior server 204 configured to receive the browser cookie information from the advertisement server 202, identify the browser-login mapping information corresponding to the browser cookie information from the user profile database 205, identify user profile information from the browser-log mapping information, and transfer the identified user profile information to the advertisement server 202. The advertisement server 202 displays advertisement data associated with the user profile information on a web page.

Depending on an aspect of the present invention, the advertisement server 202 may include an advertisement database 203 configured to store advertisement data associated with individual user profile information. In order to display advertisement data targeted for a particular user, the advertisement server 202 may store advertisement data in association with user profile information about each user characteristic.

Also, the advertisement server 202 may assign browser cookie information to the web browser 201 to identify the web browser 201. When an information request is received from a logged-in user, the advertisement server 202 may identify login cookie information of the user. The login cookie information may be profile information of the user, such as a sex, an age, a region, and the like. The advertisement server 202 may store the identified browser cookie information and the login cookie information in a log.

According to an aspect of the present invention, the user behavior server 204 may generate browser-login mapping information by mapping the browser cookie information and the login cookie information via log analysis and store the generated browser cookie information in the user profile database 205. The user behavior server 204 may verify the user profile information based on the browser-login mapping information.

Figure 3:
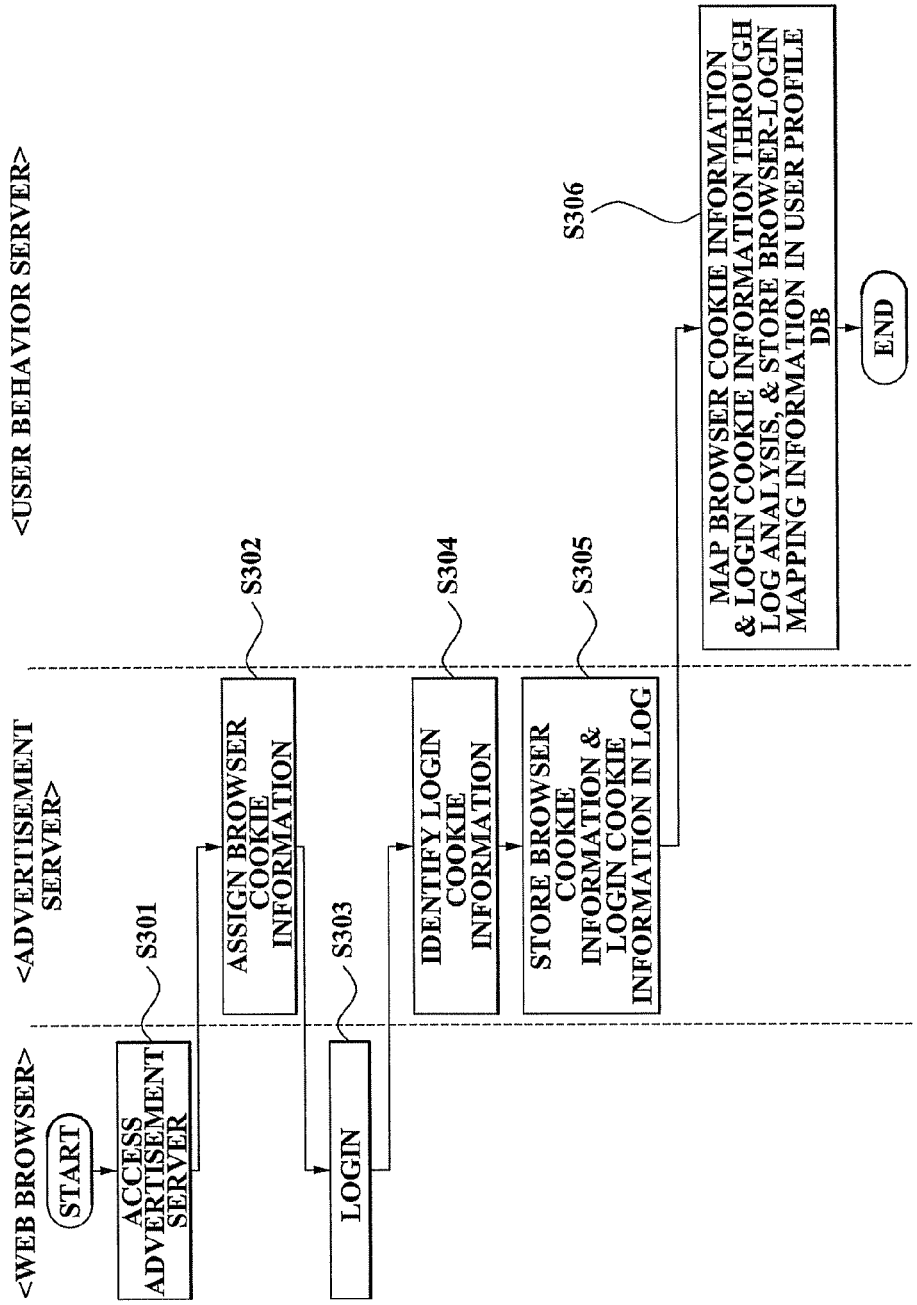
FIG. 3 is a flowchart illustrating a method of constructing a user profile database according to an exemplary embodiment of the present invention.

FIG. 3 is a flowchart illustrating a method of constructing a user profile database according to an exemplary embodiment of the present invention. The method may be performed by the target advertising system 200 shown in FIG. 2.

In operation S301, a web browser accesses an advertisement server according to a request from a user. The user may access the advertisement server through the web browser using all different types of Internet-accessible terminals.

In operation S302, the advertisement server recognizes the access by the web browser and assigns browser cookie information to the web browser. A browser cookie denotes a value that is issued to identify each unique web browser accessing the advertisement server. Accordingly, the browser cookie is issued to a single web browser only once. When the user deletes the previously issued cookie another browser cookie may be issued. According to an aspect of the present invention, the advertisement server may issue browser cookie information only once in association with an initially web browser. When the user deletes cookie information of the advertisement server, re-issuance may become possible. The browser cookie information is an identifier used for identifying the web browser accessing the advertisement server. Therefore, the advertisement server may identify the browser cookie information of the web browser and thereby display particular advertisement data for the user of the web browser.

In operation S303, the web browser logs in via the web browser, using a user identifier (ID) and a password entered from the user. When the logged-in user accesses the advertisement server, the advertisement server may identify, from the logged-in cookie, user profile information such as the user's sex, age, and region, and store the identified user profile information in a user profile database.

According to an aspect of the present invention, the user profile information may be individual user information that is associated with a demographic classification category. The demographic classification category denotes demographical features that determine how people of a targeted group such as a sex, an age, an income, a marriage, a geopolitical location, and an occupation are classified and which group the classified people will belong to. The advertisement server may use the demographic classification category to provide tailored advertisement data for each user.

In operation S304, the advertisement server identifies login cookie information of the logged-in user. The login cookie information is user profile information such as a user ID, an age, a sex, a region, and the like. For example, for women in their twenties, the advertisement server may display advertisement data associated with diet, miniskirts, skin care, and the like. For teens, the advertisement server may display advertisement data associated with concerts where famous pop singers will appear. For this, there is a need for information regarding an age, a matter of interest, a main activity area, and the like, of a currently accessing user. The advertisement server may obtain the needed information from the user profile information.

In operation S305, the advertisement server may store the assigned browser cookie information and the login cookie information in a log. According to an aspect of the present invention, the login rate may not be very high due to the website characteristics of search portal sites, whereas the probability of at least one login may be very high. Accordingly, when users login, the advertisement server may store login cookie information of each logged-in user in the log together with the browser cookie information of the web browser.

In operation S306, the user behavior server maps the browser cookie information and the login cookie information via log analysis and stores the browser-login cookie information in the user profile database. According to an aspect of the present invention, the user behavior server may analyze the browser cookie information and the login cookie information stored in the log during a predetermined period of time and generate the browser-login mapping information. For example, the user behavior server may generate the browser-login mapping information based on the stored browser cookie information and login cookie information, every day or every month.

As described above, according to the present invention, even when a user does not log in, it is possible to obtain user profile information of the user based on browser cookie information associated with a web browser of the user accessing an advertisement server.

Figure 4:
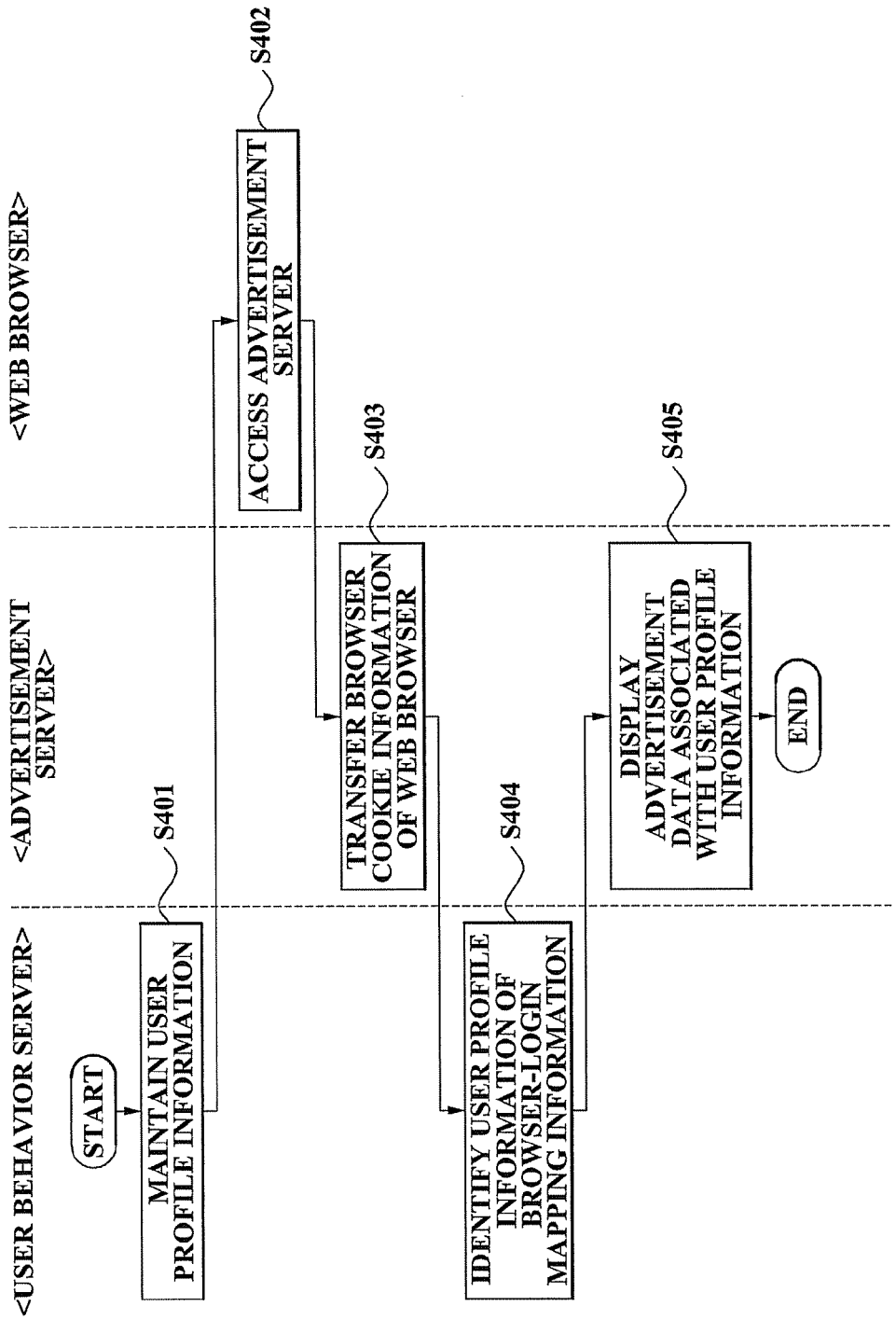
FIG. 4 is a flowchart illustrating a target advertising method according to an exemplary embodiment of the present invention.

FIG. 4 is a flowchart illustrating a target advertising method according to an exemplary embodiment of the present invention.

In operation S401, a user profile database of a user behavior server maintains user profile information.

Hereinafter, an example of a user profile database will be described with reference to FIG. 5.

As shown in FIG. 5, the user profile database stores browser-login mapping information and user profile information. The browser-login mapping information may be generated by mapping browser cookie information and login cookie information, and may also be generated by combining the browser cookie information and the login cookie information. For example, the browser-login mapping information may be "B1000000001-CHM112" and user profile information corresponding thereto may include "AGE 25, SEX FEMALE, REGION SEOUL", and the like.

Accordingly, the user behavior server may identify the user profile information based on the browser-login mapping information corresponding to browser cookie information received from an advertisement server, and transmit the identified user profile information to the advertisement server.

FIG. 6 illustrates an example of an advertisement database according to an exemplary embodiment of the present invention.

As shown in FIG. 6, the advertisement database may store advertisement data in association with individual user profile information such as age (teens, twenties, thirties, etc.), sex (female and male), region (SEOUL, GYEONGGI, etc.) and the like. For example, the advertisement database may store advertisement data associated with babies and food for women in their thirties, and may store advertisement data associated with saving and financial strategies for men in their thirties. As advertisement data associated with the saving, it is possible to display bank sites, insurance sites, and saving-related books, moving pictures, and texts, and the like.

In operation S402, the web browser accesses an advertisement server. In operation S403, the advertisement server transfers browser cookie information of the web browser to a user behavior server. In order to display target advertising data tailored for the user of the web browser, the advertisement server may transfer the browser cookie information to the user behavior server and thereby receive user profile information of the user from the user behavior server.

In operation S404, the user behavior server receives the browser cookie information from the advertisement server and identifies, from the user profile database, browser-login mapping information corresponding to the browser cookie information. The user behavior server transmits user profile information of the identified browser-login mapping information to the advertisement server.

In operation S405, the advertisement server receives the user profile information from the user behavior server, identifies advertisement data associated with the user profile information from the advertisement database, and displays the identified advertisement data on a web page.

According to an aspect of the present invention, it is possible to display advertisement data for each user's age, sex, and region by storing advertisement data in association with user profile information that is associated with a demographic classification category.

The target inventory extending method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there may be provided a method and system for extending a target inventory through browser-login mapping that can store browser-login mapping information that is generated by mapping browser cookie information and login cookie information, identify from the browser-login mapping information user profile information of a web browser that accesses an advertisement server, and display particular advertisement data associated with the identified user profile information, and thereby can maximize the target advertising effect.

Also, according to the present invention, there may be provided a method and system for extending a target inventory through browser-login mapping that can analyze browser cookie information and login cookie information stored in a log during a predetermined period of time, generate browser-login mapping information associated with user profile information, and even when a user accesses an advertisement server without logging-in, can display tailored advertisement data for the user using the browser-login mapping information and thereby can extend the target inventory.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A target advertising system to a plurality of web browsers, the system comprising:
   a user profile database, coupled to a user behavior server, configured to store browser-login mapping information and login cookie information, the browser-login mapping information being generated by mapping browser cookie information with the login cookie information, the browser cookie information being assigned to each of the plurality of web browsers; and
   an advertisement server configured to uniquely identify each browser using the browser cookie information assigned to the respective web browsers in response to receipt of each of the web browsers accessing the advertisement server, and to identify the login cookie information of a logged-in user upon receiving an information request from the logged-in user, wherein
   in response to receipt of browser cookie information of a web server upon the web browser accessing the advertisement server when a user does not log in the advertisement server, the user behavior server is configured to map the browser cookie information and the login cookie information with user profile information of the user,
   and wherein the advertisement server is configured to identify user profile information of the web browser among the plurality of web browsers based on the browser-login mapping information and to select targeted advertisement data and to display the targeted advertisement data associated with the identified user profile information corresponding to browser-login mapping information on a web page.

2. The system of claim 1, wherein the advertisement server assigns browser cookie information to one of the user web browsers accessing the advertisement server, and in response to receipt of an information request from a logged-in user, identifies the login cookie information of the user, and stores the browser cookie information and the login cookie information in an advertisement server log, and
   the user behavior server identifies the browser-login mapping information which corresponds to the browser cookie information and stores the user profile information in the user profile database.

3. The system of claim 2, wherein the user behavior server analyzes the browser cookie information and the login cookie information that are stored in the advertisement server log during a period of time, and maps the browser cookie information and the login cookie information to generate the browser-login mapping information.

4. The system of claim 1, wherein the user profile information is individual user information corresponding to a demographic classification category comprising a sex, an age, and a region associated with the user.

5. The system of claim 4, wherein the advertisement server comprises an advertisement database that stores advertisement data corresponding to the user profile information, wherein the advertisement server identifies advertisement data corresponding to the user profile information based on the browser-login mapping information, and displays the identified advertisement data on the web page.

6. The system of claim 1, wherein the browser-login mapping information is generated by mapping browser cookie information with the login cookie information or by combining the browser cookie information and the login cookie information.

7. A method for providing a target advertising, the method comprising:
   assigning browser cookie information to a web browser in response to receipt of accessing a server, the browser cookie information being respectively assigned to a plurality of web browsers to uniquely identify each browser;
   identifying login cookie information of a logged-in user upon receiving an information request from the logged-in user;
   storing the browser cookie information and the login cookie information in a server log;
   generating browser-login mapping information by mapping the browser cookie information and the login cookie information with user profile information of the user, wherein the browser-login mapping information is stored in a database;
   receiving browser cookie information of a web browser upon the web browser accessing a server when a user does not log in the server;
   retrieving, from the database, browser-login mapping information according to the received browser cookie information which corresponds to the browser-login mapping information;
   identifying user profile information of the web browser among the plurality of web browsers based upon the retrieved browser-login mapping information; and
   selecting targeted advertisement data and displaying the targeted advertisement data associated with the identified user profile information corresponding browser-login mapping information on a web page.

8. The method of claim 7, wherein generating the browser-login mapping information further comprises:
   mapping the browser cookie information with the login cookie information via log analysis to store the user profile information in the database.

9. The method of claim 8, wherein the operations of assigning, identifying and storing are implemented at the server.

10. The method of claim 8, wherein generating the browser-login mapping information further comprises:
    analyzing the browser cookie information and the login cookie information that are stored in the server log during a period of time;

mapping the browser cookie information with the login cookie information to generate the browser-login mapping information; and storing the generated browser-login mapping information in the database.

11. The method of claim 10, wherein the operations of analyzing, mapping and storing are implemented at a user behavior server.

12. The method of claim 7, wherein the user profile information is individual user information corresponding to a demographic classification category comprising a sex, an age, and a region associated with the user.

13. The method of claim 12, wherein displaying further comprises:

storing advertisement data corresponding to the user profile information in an advertisement database; and identifying the advertisement data corresponding to the user profile information of the web browser to display the identified advertisement data on the web page.

14. The method of claim 7, further comprising:

transferring the received browser cookie information to a user behavior server, wherein the user behavior server retrieves a browser-login mapping information associated with the received browser cookie information from the database and identifies user profile information based upon the retrieved browser-login mapping information.

15. The method of claim 7, wherein the browser-login mapping information is generated by mapping browser cookie information with the login cookie information or by combining the browser cookie information and the login cookie information.

16. A non-transitory computer-readable storage medium comprising a computer executable program, which when executed by a processor, causes the processor to perform:

assigning browser cookie information to a web browser in response to receipt of accessing a server, the browser cookie information being respectively assigned to a plurality of web browsers to uniquely identify each browser;

identifying login cookie information of a logged-in user upon receiving an information request from the logged-in user;

storing the browser cookie information and the login cookie information in a server log;

generating browser-login mapping information by mapping the browser cookie information and the login cookie information with user profile information of the user, wherein the browser-login mapping information is stored in a database;

receiving browser cookie information of a web browser upon the web browser accessing a server when a user does not log in the server;

retrieving, from the database, browser-login mapping information according to the received browser cookie information which corresponds to the browser-login information;

identifying user profile information corresponding to each of the plurality of the web browsers based upon the retrieved browser-login mapping information; and selecting targeted advertisement data and displaying advertisement data associated with the identified user profile information corresponding browser-login mapping information on a web page.

17. The non-transitory computer-readable storage medium of claim 16, wherein the browser-login mapping information is generated by mapping browser cookie information with the login cookie information or by combining the browser cookie information and the login cookie information.

* * * * *